United States Patent [19]
Bertolet, Jr.

[11] 3,873,663

[45]* Mar. 25, 1975

[54] METHOD OF MOLDING POWDERED MATERIAL

[76] Inventor: Elmer C. Bertolet, Jr., 101 E. Germania, Brenham, Tex. 77833

[*] Notice: The portion of the term of this patent subsequent to June 25, 1991, has been disclaimed.

[22] Filed: Feb. 17, 1971

[21] Appl. No.: 116,204

Related U.S. Application Data
[63] Continuation-in-part of Ser. No. 793,463, Jan. 23, 1969, abandoned.

[52] U.S. Cl. .............................. 264/120, 264/314
[51] Int. Cl. .............................................. B29c 3/06
[58] Field of Search .......... 264/127, 109, 314, 318, 264/313, 120

[56] References Cited
UNITED STATES PATENTS
| | | | |
|---|---|---|---|
| 2,617,152 | 11/1952 | Rubin | 264/127 |
| 2,851,725 | 9/1958 | Bauer | 264/127 |

Primary Examiner—Donald J. Arnold
Assistant Examiner—J. R. Hall
Attorney, Agent, or Firm—Bertram H. Mann; Frank B. Pugsley

[57] ABSTRACT

A method of molding powdered polytetrafluoroethylene (Teflon) or like material of limited flowability under pressure to form a hollow article having an external wall with one or more substantial, abrupt protrusions or offsets. The mold cavity and recessed mold wall structure reversely imagining the protrusions are both charged with the desired quantity of the powdered material. A flexible diaphragm or bladder forms the inner wall of the mold cavity opposite the recessed wall structure, and a plunger is movably mounted in each recess. The diaphragm and plungers are subjected to uniform fluid pressures so to move in substantially direct opposition and thereby uniformly compact the powdered material in the mold cavity and the recess without producing substantial shear planes or other flaws at the intersections between the body of the article and the mentioned protrusions.

6 Claims, 10 Drawing Figures

Elmer C. Bertolet, Jr.
INVENTOR.

Elmer C. Bertolet, Jr.
INVENTOR.

BY Bertram H. Mann

ATTORNEY

Elmer C. Bertolet, Jr.
INVENTOR.

BY Bertram H. Mann

ATTORNEY

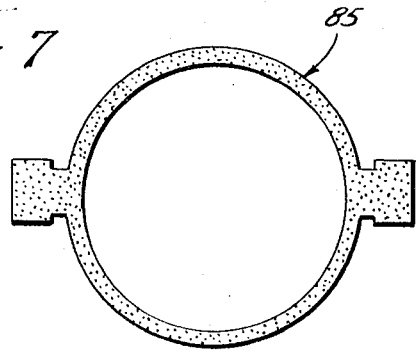
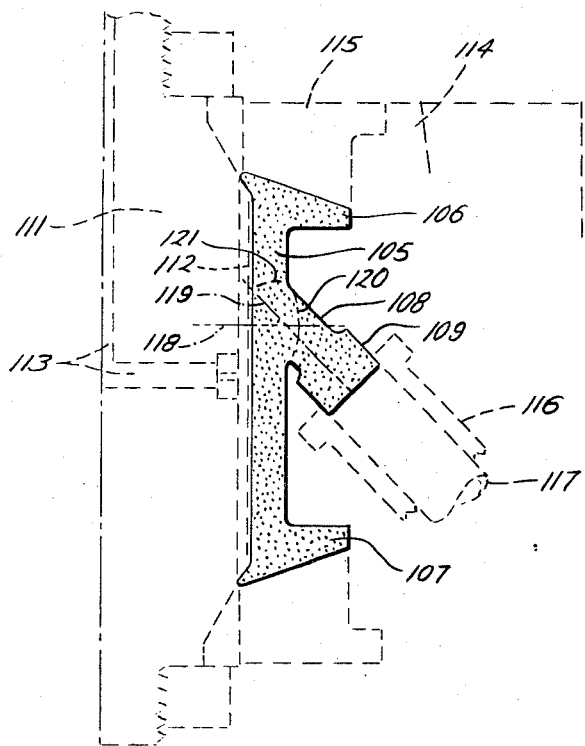
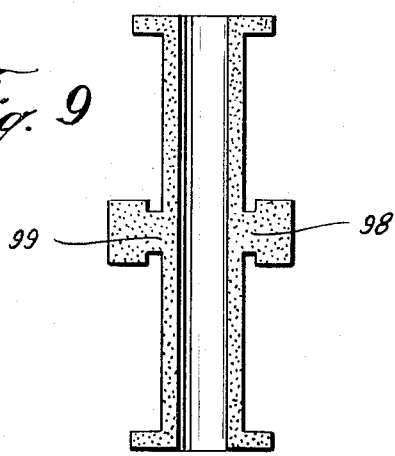
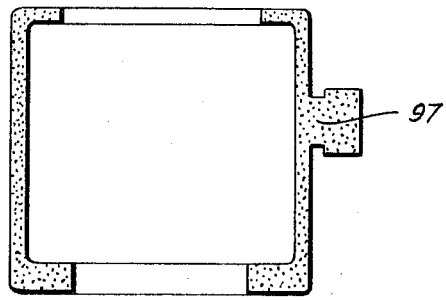
Elmer C. Bertolet, Jr.
INVENTOR.
BY Bertram S. Mann
ATTORNEY

METHOD OF MOLDING POWDERED MATERIAL

RELATED APPLICATION

This application is a continuation-in-part of my copending application Ser. No. 793,463 filed Jan. 23, 1969 now abandoned.

BACKGROUND OF THE INVENTION

The invention relates to a method for molding powdered materials such as polytetrafluoroethylene (Teflon), powdered metal, or like materials which exhibit only limited flowability when subjected to pressure. The invention consists more particularly in a novel method for forming a hollow article of such material where the article has non-planar external wall structure with substantial, abrupt offsets or bosses into which it is difficult to feed or press the powdered molding material from the main mold cavity.

Powdered polytetrafluoroethylene (hereinafter referred to as P.T.F.E.) and certain other powdered materials are capable of only limited flow when subjected to pressure in a mold. The P.T.F.E., having no true melt point, cannot be uniformly molded into complex shapes even at high gel point temperatures. Simple shapes can be molded of this material by sintering with the use of heat and pressure. However, complex shapes if molded, even after heating to high temperatures and subsequently holding in a complex cavity under pressure until cool (a method known as "coining" or "hobbing"), are highly stressed and, therefore, subject to "movement" upon aging, which "movement" is accelerated by subjection to elevated temperatures. If the elevated temperature reaches the upper transition temperature, or gel temperature, of approximately 620°F and the coined part originally was not subjected to such distortion as to break the lattice structure of the polymer, the part will return to its original simple form. This lack of dimensional stability results in limited use of the coining process. The lack of a true melt point also has prevented the true welding of parts made from this polymer and, in such cases as a "weld" has been accomplished, only simple planar welds have been known, in which complete fusion is not exhibited.

In recent years, hydrostatic molding techniques have been introduced into the processing of P.T.F.E. polymer, enabling many improvements to be made in production of rather complex, for instance, non-planar, parts with resultant economic advantages such as elimination of extensive machining or fabrication through secondary operations, great reduction in bulk material requirements through elimination of excess material in such areas as undercuts and the like, plus production of parts in which equalized pressures are applied to all parts of the powder in contact with the pressure medium. The resultant parts are not only of great economic import but, generally, also are of superior physical properties due to the equalized pressure received over all areas. This art has been demonstrated in the powdered metal, ceramic, and felt hat fields over the years, involving either immersion into an hydraulically pressurized chamber (the material to be pressed being suitably enclosed in an impermeable, flexible bag or membrane) or the material being placed in a suitable mold or form and subjected to pressure via transmission through a flexible, non-permeable membrane or bag, which membrane is sealingly attached to the molding apparatus.

While application of the foregoing processes has resulted in improvements in molding techniques for processing of P.T.F.E. and other like materials, limitations have existed due to the limited flowability and weldability of such materials, whereby abrupt changes of cross section or protrusions of significant dimensions from non-planar surfaces could not be produced by known methods. However, the advantages of P.T.F.E., in particular, in resistance to heat, corrosion, contamination, sticking to fluids and solids, and the like, are such that there is a demand for methods and equipment which will enable satisfactory formation of relatively complicated shapes of this material.

In accordance with the present invention, there have been produced for the first time, dimensionally stable parts of relatively complicated shape in which all integral portions are uniform in physical characteristics and will not fail in service due to weak areas resulting from lack of uniform pressure applied to all parts or the development of shear planes or stress cracking.

Accordingly, an object of the present invention is to provide a novel method for molding P.T.F.E. and similar relatively non-flowable powdered materials.

Another object is to provide a novel method for molding hollow or annular articles of such materials where the articles have substantial, abrupt lateral offsets and/or undercuts or shoulders.

BRIEF DESCRIPTION OF THE DRAWINGS

These objects and others hereafter appearing are attained by the method steps illustrated in the accompanying drawings, in which:

FIG. 7 is a section on line 7—7 of FIG. 6.

FIGS. 8 and 9 are sections of still other parts which may be successfully molded for the first time with the use of the novel method and apparatus herein disclosed and claimed.

FIG. 10 is a vertical transverse section illustrating apparatus and method for preforming a piping joint.

DETAILED DESCRIPTION OF THE DRAWINGS

In accordance with my present invention, a mold is constructed having an annular main pressure cavity and with a first non-planar wall structure having one or more recesses which reversely images the external wall with protrusions of the article to be molded. Opposite this recessed mold wall structure there is provided a second wall in the form of a flexible diaphragm or bladder, and in each recess there is a third, movable wall in the form of a plunger. When the mold is closed, predetermined uniform hydraulic or pneumatic forces are applied to the diaphragm and to the plungers for causing substantially directly opposite movement of the proximate parts of the diaphragm and plunger. This causes uniform compaction of the molding material in the main cavity and the recess or recesses. The portions of the powdered molding material in the cavity and recesses move along opposing parallel lines so as to merge in the throat connections between the cavity and recesses, so that this material need not flow to a substantial extent around any substantial offset or through any substantially reduced area. Moreover, since there is substantially no relative lateral movement of the powder portions adjacent the throat connections, the resultant preformed article is not only of highly uniform density and homogenization but also is free of shear planes, fractures, or other flaws, particularly at the mentioned connections.

Several mold structures are illustrated for utilizing and applying the improved method steps wherein the powdered material is subjected to opposite compression forces, e.g., forces at at least approximately 180° apart e.g., substantially parallel. Such molding forces take best advantage of the slight flowability of the powdered material used both along the compaction force vectors and at slightly divergent angles with respect thereto. Thus, the invention may be utilized in fabricating a piping joint in which the masses of molding material in the legs merge in the planes which are not exactly normal to any of the force vectors applied in preforming the part.

Figure 1:
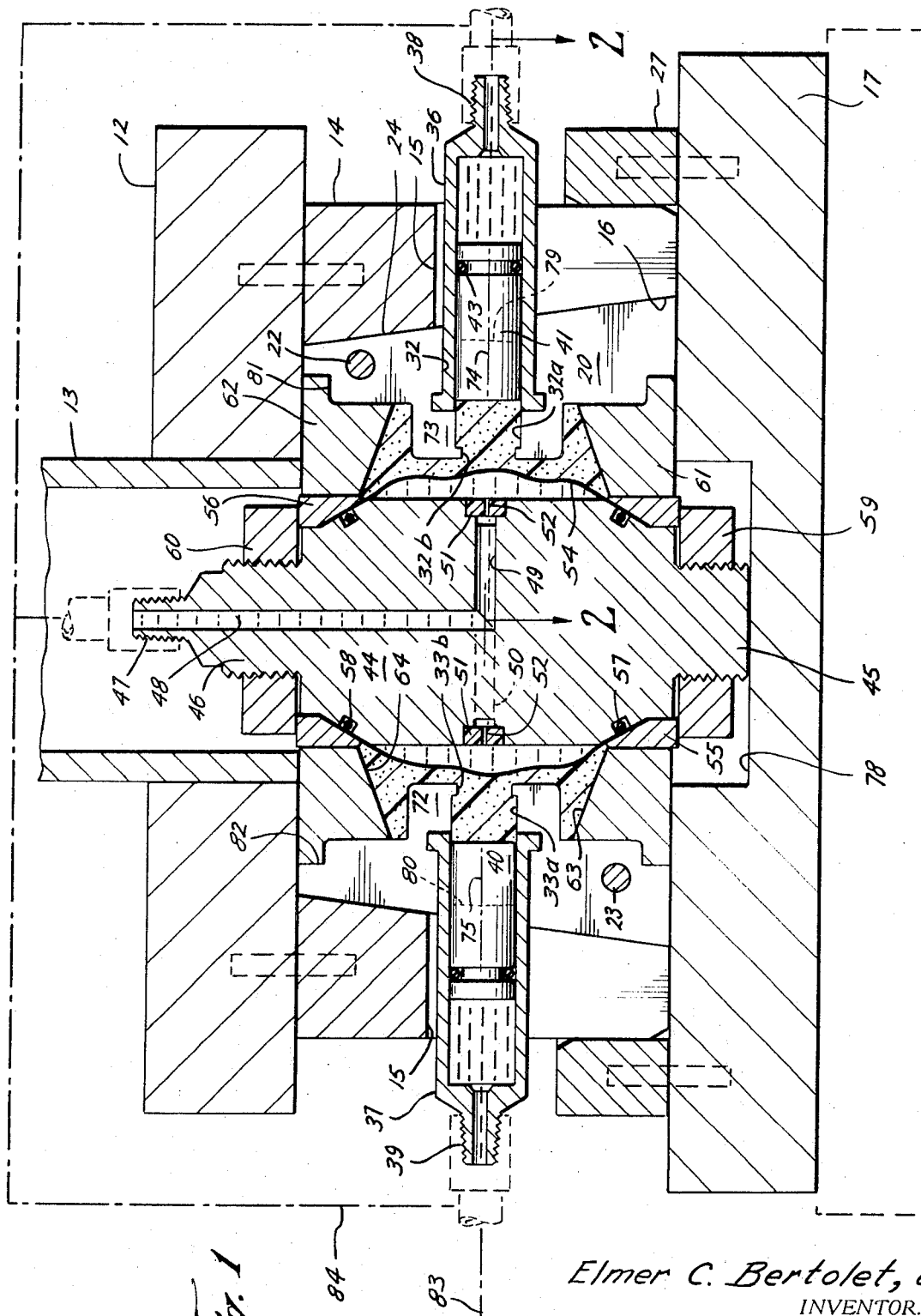
FIG. 1 is a vertical transverse center section through a press mold used in preforming a disk or butterfly valve body liner of powdered P.T.F.E. or like material.
Figure 2:
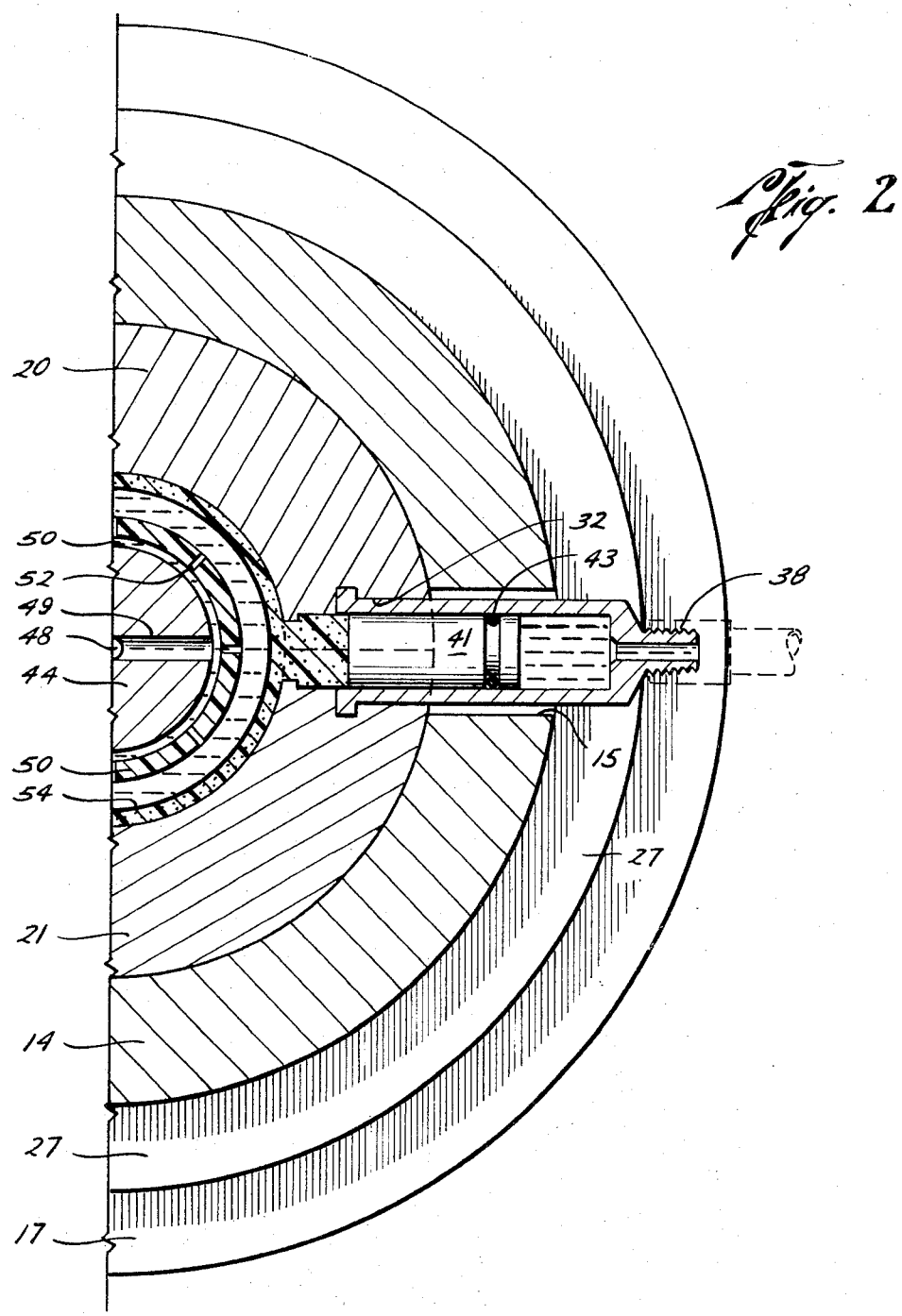
FIG. 2 is a half section taken substantially on line 2—2 of FIG. 1.
Figure 3:
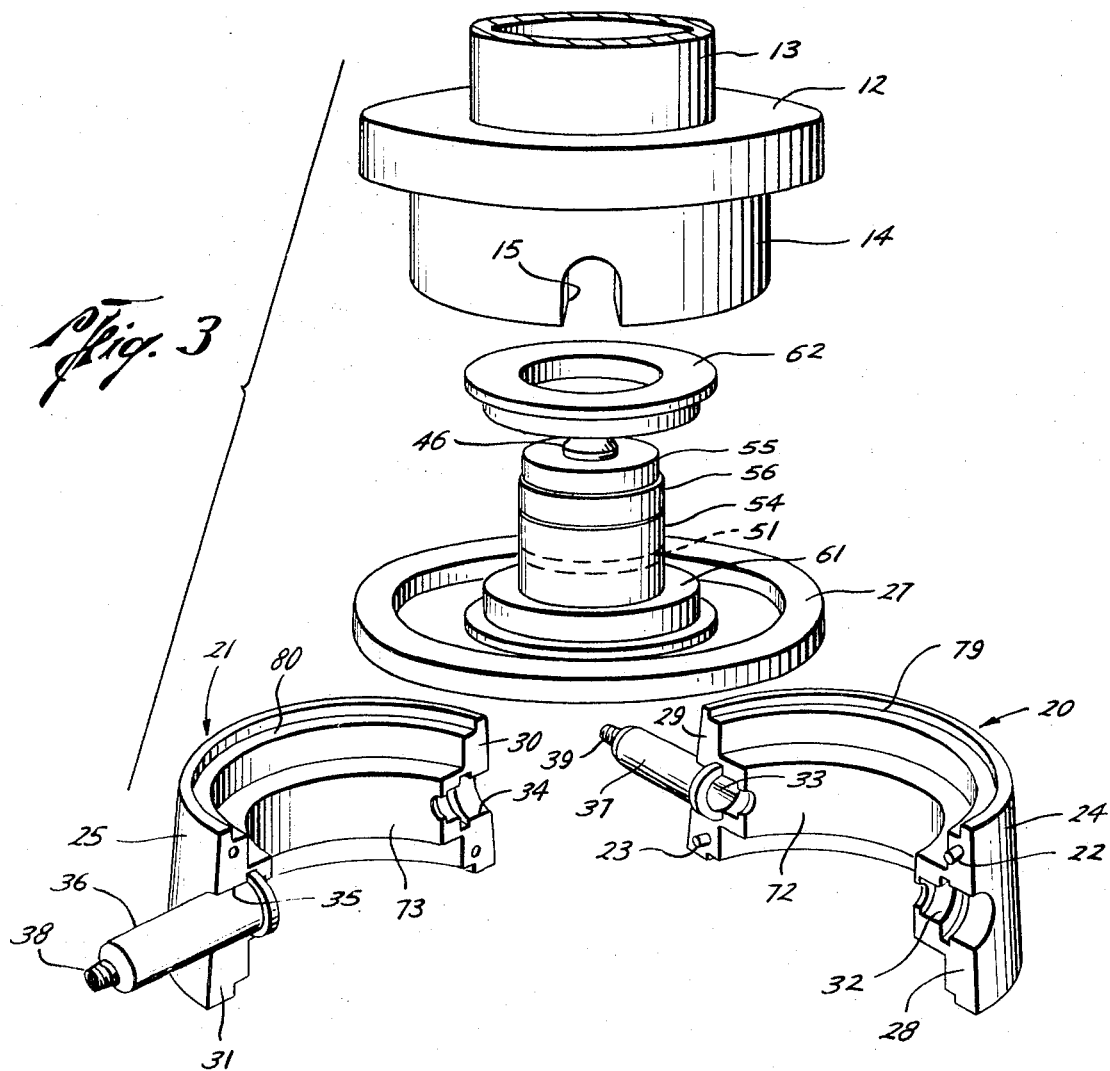
FIG. 3 is an exploded perspective view of the press apparatus utilized in FIGS. 1 and 2.

The apparatus illustrated in FIGS. 1, 2, and 3 comprises a top platen 12 secured to a depending column 13 and from which depends an annular collar 14 periodically recessed at 15 for a purpose to be described. The inner face 16 of collar 14 is inclined downwardly and outwardly as shown in FIG. 1. The bottom or press platen 17 is mounted for upward movement, as by a ram mechanism (not shown), to lock the mold parts together.

The mold itself is formed of split sleeve wedging members 20 and 21 receiving guide pins 22 and 23 and having downwardly and outwardly inclined outer surfaces 24 and 25 (FIG. 3) for wedgingly bearing against collar 14. Split sleeve members 20 and 21, in the assembled mold, bear at their upper edges against upper platen 12 for limiting the vertical pressure applied by bottom platen 17 and thereby establishing the vertical dimension of the mold cavity. A reinforcing ring 27 is secured to bottom platen 17 and abuts the lower edge of collar 14.

As best shown in FIG. 3, the mating end faces 28 – 31, inclusive, of split sleeve members 20 and 21 are provided with specially shaped recesses 32 – 35, inclusive, for receiving therebetween the inner ends of flanged pressure cylinders 36 and 37 having threaded nipples 38 and 39 at their outer ends and receiving slidable press plungers 40 and 41 with seat rings 42 and 43.

The inner part of the mold is formed by a core or body member 44 having a non-perforated, threaded boss 45 at the lower end and stepped, threaded nipples 46 and 47 at the upper end. The core is axially drilled from the top at 48 and transversely at 49 to connect with a slot 50 surrounding the waist of the core. A ring 51 of resilient plastic is received in slot 50 and is provided with periodical holes 52 for transmitting fluid from bores 48 and 49 and slot 50 externally of the core.

Received upon the core 44 is a flexible diaphragm or bladder 54 of generally cylindrical form sealingly secured to the core by means of lower and upper end rings 55 and 56 with tapered inner faces bearing against the end portions of the bladder or diaphragm encompassing seal rings 57 and 58. These end rings, in turn, are secured sealingly against the bladder and core by means of ring nuts 59 and 60 threaded on boss 45 and nipple 46. The main mold cavity is completed by bottom and top ring plates 61 and 62 having inclined facing surfaces 63 and 64.

Figure 4:
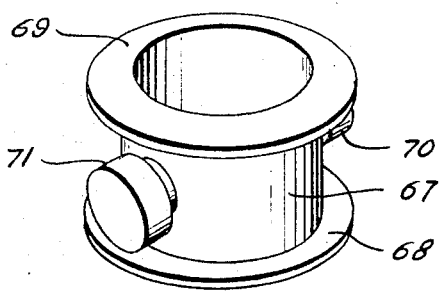
FIG. 4 is a reduced perspective view of valve body liner blank performed by the method illustrated in FIGS. 1, 2, and 3.

FIG. 4 shows the butterfly valve body liner blank which is preformed, for instance, of compacted powdered P.T.F.E., with the use of the illustrated mold and method. This part has a hollow, cylindrical body with an outer wall 67, end flanges 68 and 69, and undercut bearing bosses 70 and 71. Ring plates 61 and 62 and split sleeve members 20 and 21, in the assembled mold, form a wall structure opposing diaphragm 54 and reversely imaging the outer surfaces of the blank. Diaphragm 54 is in effect sealingly secured to the edges of this wall structure as well as core 44.

Cylinders 36 and 37 (FIGS. 1 and 3) terminate intermediately of recesses 32 – 35 in the ends of the split sleeve members. The recess portions 32a, 33a, etc., of these mating recesses (FIG. 1) formed in inward ridges 72 and 73 on sleeve members 20 and 21, are aligned with and co-extensive diametrically with the interiors of the cylinders. Recess portions 32a and 33a communicate with the main molding cavity through somewhat restricting shouldered throat connections 32b and 33b. The coextensive axes of the cylinders and recesses are also coextensive with the resultant force lines or vectors of the compaction forces applied by the proximate parts of diaphragm or bladder 54 and plungers 40 and 41 to throat connections 32b and 33b, represented by dot and dash lines 74 and 75.

OPERATION

In the use of the novel method, the lower end 45 of core 44 is inserted in recess 78 in the upper surface of press platen 17 with bladder or diaphragm 54 secured in position by parts 55, 56, 59, and 60 and with bottom ring plate 61 also in position. Next split sleeve members 20 and 21 with cylinders 36 and 37 in position are applied about bottom ring plate 61. Then, with top ring plate 62 not yet in position, the mold cavity is filled with the powdered material, for instance, P.T.F.E. Due to the substantial depth of recess portions 32a and 33a, it will usually be necessary to precharge these recesses and cylinders 36 and 37 to dot and dash lines 79 and 80 with measured quantities of the powdered material, with plungers 40 and 41 retracted. Top ring plate 62 is then applied to the rabbeted upper end portions 81 and 82 of split sleeve members 20 and 21 to complete the mold cavity.

Bottom platen 17 is then raised to insert split sleeve members 20 and 21 within wedging collar 14 so as to tightly secure the sleeve members in position and firmly enclose the annular molding cavity. Finally, fluid, preferably hydraulic, lines 83 and 84 are connected to threaded nipples 38 and 39 on cylinders 36 and 37 and also nipple 47 on mandrel 44. These fluids lines are connected to a source of fluid pressure schematically represented at 83a. Fluid pressure is then applied simultaneously and uniformly to all of the pressure points so as to uniformly drive plungers 40 and 41 inwardly while expanding bladder or diaphragm 54. The result is that opposing compaction forces in the cavity and recesses are substantially aligned and opposite (e.g., parallel), as explained. The quantities of molding powder in the main body of the cavity as well as in the cylinders and recesses are measured so that the intersection regions between the two quantities within throat connections 32b and 33b, will be homogenized. This results from the new method which avoids the necessity of attempting to flow the molding powder from the mold cavity around and through the thorat connections. Rather, the compaction forces applied by the diaphragm and plungers act oppositely substantially along the recess axes or vectors 74 and 75 so that the powder in the main cavity and in the offset recesses will meet in parting regions in the throat connections which are normal to those axes or vectors. Accordingly, thorough blending of the separate quantities of material occurs adjacent these throat connections and avoidance of relative lateral displacement of the powder particles prevents the formation of shear plane flaws at these regions.

Following the application of molding pressure, as explained, bottom platen 17 will be lowered and split collars 20 and 21 and upper ring plate 58 will be removed to permit withdrawal of the preformed blank, as shown in FIG. 4. The preformed article is thereafter sintered so that the molding material is coalesced into a tough, crystalline-type plastic. Finally, the sintered article is machined by boring the bearing bosses 68 and milling the inner surface of body 67 and the end surfaces of flanges 69 and 68. The finished article is substantially free of machining and other stresses as well as shear planes, particularly at the throat connections 32b and 33b and, otherwise, is singularly free of flaws and of excellent strength and dimensional stability and free of stresses. Moreover, due to the minimum machining operations necessary, much material can be saved. Careful control of processing conditions such as pressure applied and subsequent control of thermal cycling will result in maintenance of extremely close tolerances and reproducibility from part to part. For instance, reproducibility of o.d. of the body portion 67 may be held to well with ±0.010 inches on a 2-inch diameter part, while the length of the body can be held within ±0.005 inches in a 1½-inch length.

Of course, where a change in properties of selected parts of the molded article is deemed desirable for specific end use requirements, such as increased resistance to flow or longer wearing characteristic, this can be accomplished through the use of special materials, such as filled compositions of P.T.F.E. (well-known for increased resistance to flow and possessing up to a thousand times the wear resistance of unfilled P.T.F.E.) at definitely planned locations. For example, it could be extremely desirable in a butterfly valve body liner, as herein described, to have the valve shaft bearing and packing protrusions made from a filled P.T.F.E. composition wherein the surfaces subjected to packing gland pressures could better resist flow and the general bearing areas could exhibit improved wear resistance. Moreover, the protrusion forming recesses in the mold could have individual, different loadings or initial charge density. Also, shouldered throat connections 32b and 33b may be omitted from the mold and the reduced necks in bosses 70 and 71 (FIG. 4) machined, if desired.

Figure 5:
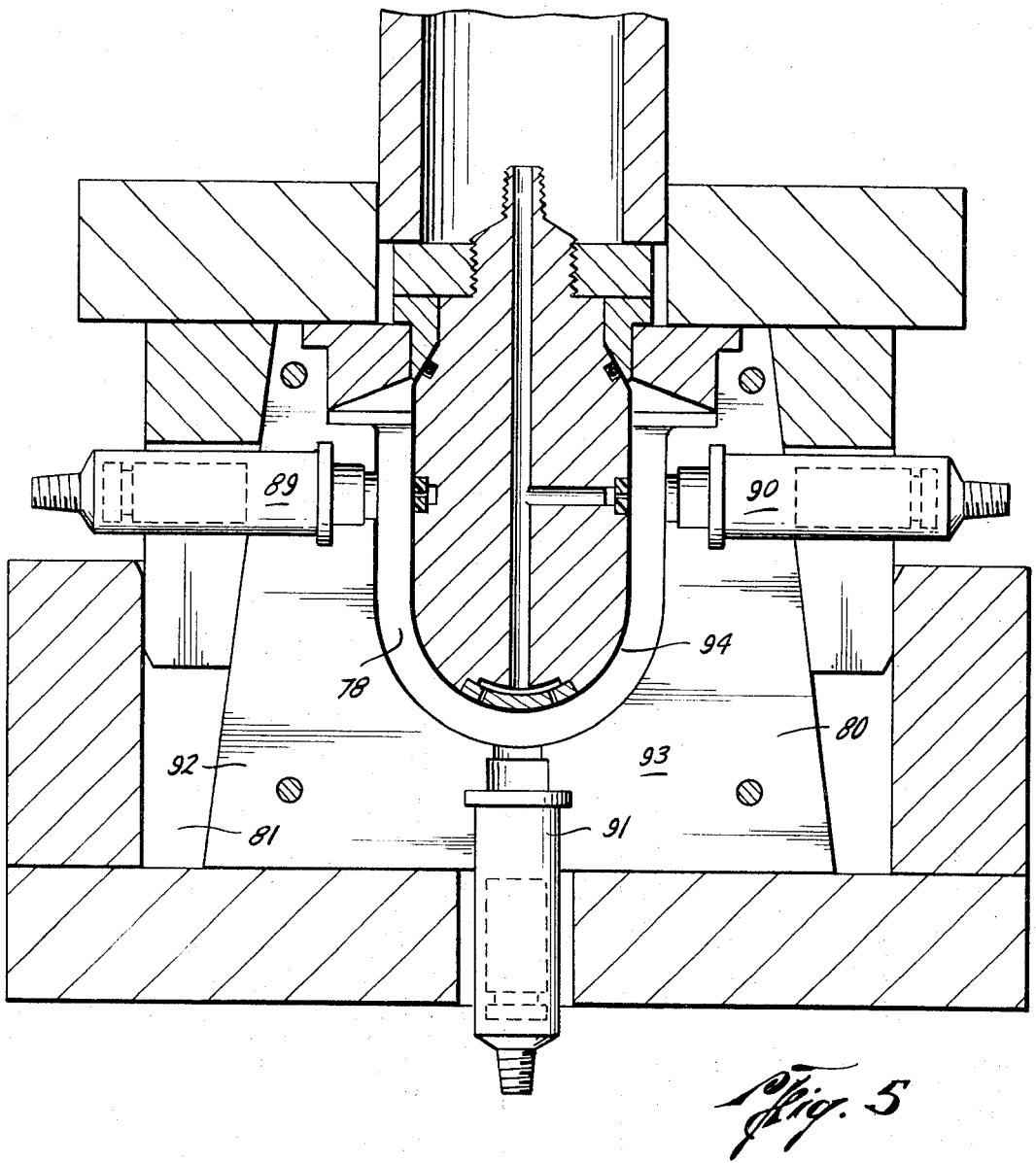
FIG. 5 is a vertical transverse section illustrating the novel method and apparatus applied to the formation of a vessel having pipe fitting boss protrusions.
Figure 6:
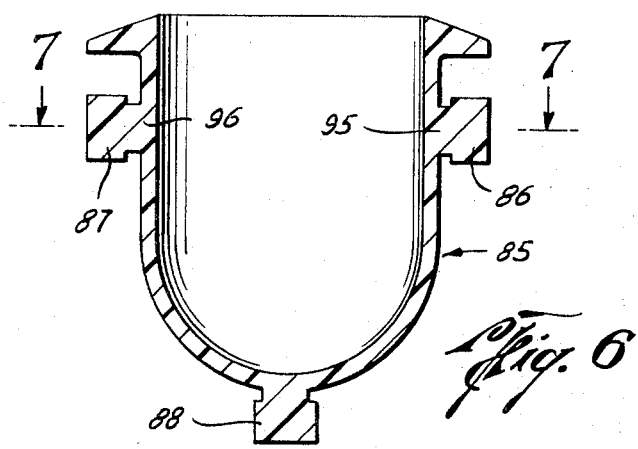
FIG. 6 is a sectional view of the vessel preformed by the method illustrated in FIG. 5.

FIGS. 5, 6, and 7 show the improved molding method applied through slightly modified compacting apparatus to the formation of a vessel 85 open at the top and closed at the bottom and provided with connection nipples or bosses 86, 87 and 88. The bosses are formed by pressure cylinders 89, 90, and 91 mounted in split sleeve members 92 and 93. As in the previous forms, diaphragm 94 and the plungers in the cylinders apply compacting forces to the molding material in the main cavity and the offset recesses substantially in direct opposition so as to form the neck portions 95 and 96 of optimum density and strength and without shear plane flaws. The parts of the molding apparatus are generally similar to those shown in FIGS. 1 -3, except for the addition between split sleeve members 92 and 93 of the bottom pressure cylinder 91.

FIGS. 8 and 9 show articles of other configurations which could not be successfully molded by P.T.F.E. by previous methods, but which may be efficiently molded by means of the procedures outlined above without flaws at the necks 97 of FIG. 8 and 98 and 99 of FIG. 9 and with only a minimum of machining operations required.

FIG. 10 shows in enlarged longitudinal section a preform blank of a plastic pipe joint having an arm or offset at other than a right angle. The main line body 105 has end bolting flanges 106 and 107, although provision could be made for threaded couplings. Offset 108 extends from the body at slight angle and has a bolting flange 109. The blank, of course, is subjected to finish machining on the end surfaces, and offset 108 must be bored. Parts of the preform mold are shown schematically including core 111 on which is sealingly mounted a bladder or diaphragm 112 which may be fluid pressured through ducts 113. At 114 and 115 are die parts, corresponding to parts 14, 20, and 62 of FIG. 1. At 116 is a transverse pressuring cylinder slidably receiving a plunger 117, corresponding to parts 36, 41 of FIG. 1. After charging of the mold cavity or cavities with molding powder, regulated fluid pressures are applied to bladder 112 and plunger 117, as in the previous cases. The preform forces are applied along vectors 118 and 119 which should be not more than about 135° apart. Curved dot-dash lines 120, 122 represent theoretical limits of flowage of the powders, respectively in the offset and the main cavity, from which it is clear that good merging will occur as long as vectors 118, 119 approach linearity and flowage lines around sharp corners are avoided.

Accordingly, durable and stable hollow articles of considerable complexity can be made by the method herein disclosed for the first time from powdered P.T.F.E. and like powdered materials which are subject to limited flowability, even when subjected to high heat. Such articles of P.T.F.E. material in particular are in great demand because of their desirable properties, such as resistance to corrosion, to temperature variations, to stress cracking, and to dimensional instability. The invention may be modified in various respects as will occur to those skilled in the art. For instance, other pressuring means could be substituted for the plungers 40 and 41 in FIGS. 1 - 3 and 117 in FIG. 10, such as closed end bellows, flexible diaphragms, and the like, Moreover, although the novel method lends itself particularly well to homogenization of molding material around shouldered throat connections as 32b and 33b, the novel method may be utilized with substantial, heretofore unappreciated benefit, where the shouldered portions 32b and 33b are omitted. Of course, the undercuts behind bosses 86, 87 in FIG. 6, for instance may be machined after completion of the molding operation. The exclusive use of all modifications as come within the scope of the appended claims is contemplated.

I claim:

1. The method of powder molding an article having a body wall and a substantially restricted lateral protrusion thereon which comprises the steps of
   a. forming a mold having first, second, and third walls defining a mold cavity,
      a-1. said first wall having an outward recess and reversely imaging said body wall,
      a-2. said second wall comprising a flexible diaphragm sealingly secured to the mold and having parts, respectively, confronting said first wall and said recess, and
      a-3. said third wall being movably mounted in said recess,
   b. charging said cavity and said recess individually with powdered molding material,
   c. applying fluid pressure to said diaphragm in opposition to said first wall,
   d. applying pressure to said third wall substantially in direct opposition to the pressure applied to the part of said diaphragm confronting said recess so as to uniformly compact the molding material into a unified body and avoid the formation of a shear plane between said cavity and said recess, and
   e. removing the unified body from the mold.

2. The method described in claim 1 in which a restricted throat connection is provided between said cavity and said recess.

3. The method described in claim 1 for molding an article having wall structure extending substantially thereabout and with a plurality of restricted lateral protrusions thereon and in which said first wall is provided with a plurality of recesses and movable walls therein reversely imaging said protrusions, and applying uniform fluid pressures to said diaphragm and said movable walls, said pressure being applied to said diaphragm generally in opposition to said first wall and to said movable walls in directions opposing and substantially parallel to the force vectors applied to the respective portions of said diaphragm aligned with said recesses.

4. In the method described in claim 1 for molding an article having a body wall extending substantially therearound and with a plurality of restricted lateral protrusions thereon, said first wall of the mold having a plurality of said recesses and movable walls therein reversely imaging said protrusions, said diaphragm having a portion substantially directly confronting each of said recesses and movable along the axis thereof,
   c-1. applying fluid pressures to said diaphragm, and
   d-1. applying substantially equal and opposite pressures to said movable walls for bonding said plastic material into a unitary article.

5. The method of compacting powdered plastic material to mold a hollow article having a nonplanar external body wall and at least one substantially restricted outward protrusion thereon comprising,
   a. providing a mold having an annular cavity comprising first, second and third walls, said first wall forming the outer wall of said cavity and reversely imaging said body external wall and also containing at least one outward recess for forming said protrusion, said first wall containing between said cavity and said recess a restricted throat connection so as to restrict flowage of said material therethrough, said second wall comprising a flexible diaphragm opposedly facing said first and third walls and having edges sealingly secured to the edges of said first wall, said third wall being movably positioned within said recess for movement toward said diaphragm,
   b. charging said cavity and said recess with individual measured portions of said plastic powder,
   c. applying pressure to said diaphragm to move the same toward said first and third walls to compact said powdered plastic material into a uniformly bonded article,
   d. applying pressure to said third wall to move the same toward said diaphragm to uniformly and opposedly compact said plastic powder portions and to avoid substantial nonparallel flow of said powder portions adjacent said throat connection and thereby avoid the formation of a shear plane flaw within the compacted material at said throat connection, and
   e. withdrawing the bonded article from the mold.

6. The method of claim 5 wherein said first wall has a plurality of said recesses for forming a plurality of said protrusions on said formed article.

* * * * *